Jan. 12, 1965  R. O. ASHWORTH  3,164,893
HUB CAP REMOVERS
Filed April 1, 1963

INVENTOR
ROBERT O. ASHWORTH

BY *William W. Stokes*
ATTORNEY

United States Patent Office 3,164,893
Patented Jan. 12, 1965

3,164,893
HUB CAP REMOVERS
Robert O. Ashworth, Wilson County, Tenn.
(Rte. 3, Lebanon, Tenn.)
Filed Apr. 1, 1963, Ser. No. 269,823
1 Claim. (Cl. 29—245)

This invention relates to wheel tools and, more specifically, to an improved device for removing hub caps or decorative wheel covers from wheel bases.

When it becomes necessary to change a tire or grease the wheel bearings of a motor vehicle, the vehicle operator or garage attendant is confronted with the often tedious and difficult task of removing the hub cap or decorative wheel cover from the wheel base. While various devices have been designed to aid the operator or attendant in this task, none have rendered the task less tedious nor less difficult. The known prior art devices have one or more of the disadvantages of not being capable of removing hub caps and decorative wheel covers of varying sizes with ease, inability to remove same with the minimal amount of physical effort, and quite often bending or deforming the hub cap locking member rendering the cover difficult to replace on the wheel.

The present invention provides an improved device of simple construction and relatively inexpensive to manufacture, which may be utilized to remove hub caps or wheel covers of varying sizes expiditiously and with a facility unobtainable when using known devices.

Accordnigly, it is an object of this invention to provide an improved wheel tool which will facilitate removal of a hub cap or decorative wheel cover from a wheel base.

It is another object of this invention to provide a hub cap puller which is simple and relatively inexpensive to manufacture, and which may be employed to remove hub caps and wheel covers of various sizes from their wheel bases without deformation of the wheel cover or locking member.

Still another object of the present invention is to provide a hub cap puller which exerts a pulling force on the hub cap in a direction substantially perpendicular or normal to the surface of the hub cap to render removal of the same easier than has heretofore been possible.

Other objects and attendant advantages of this invention will become apparent when referring to the following description and the drawings wherein like reference characters designate like parts throughout the several figures, and wherein.

Figure 1:
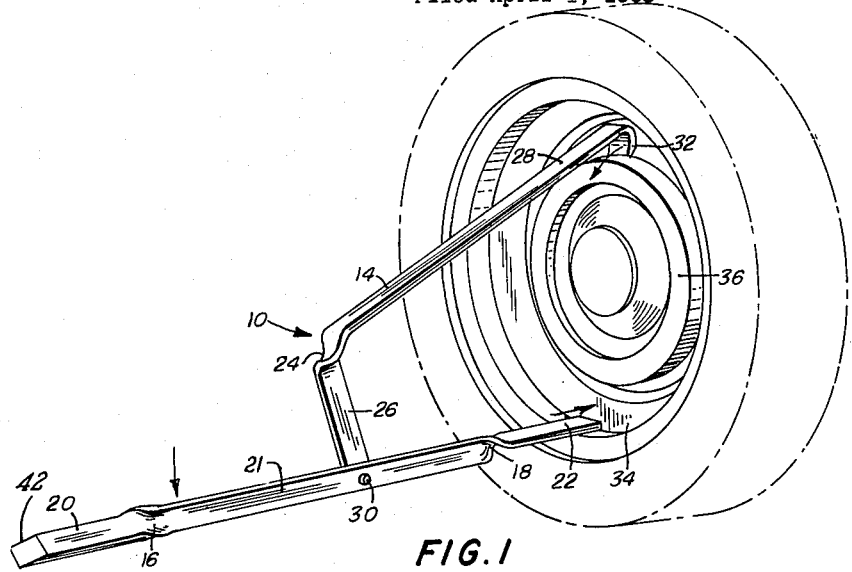
FIGURE 1 shows the device of this invention positioned to remove a hub cap from an automobile wheel base.
Figure 2:
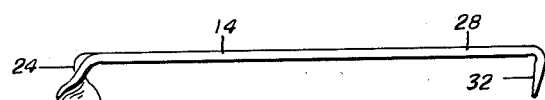
FIGURE 2 is an elevational view of the device of this invention.

For a better understanding of the novel device of the invention, reference is now made to FIGURES 1 and 2 wherein it may be seen that the hub cap or decorative cover remover 10 comprises a substantially straight lever bar 12 and an angle bar 14 substantially in the shape of a right angle. Lever bar 12 is twisted at about a 90° angle near both ends approximately at points 16 and 18 to provide a flat handle portion 20, a midportion 21, and a foot portion 22. The end of handle number 20 is tapered to provide a thin edge 42 which may be utilized to remove wheel covers which are larger than the device may accommodate. It is to be understood, however, that the device may be manufactured in varying sizes to remove any size hub cap or wheel cover. The two 90° twists at 16 and 18 impart to the device maximum strength and handling effectiveness.

Angle bar 14 is twisted and bent at a substantially 90° angle at 24 to provide a vertically extending rise 26 and a hookend extension 28. The end of the rise portion of angle bar 14 is pivotally secured by bolt 30, or other suitable means to lever bar 12 near the middle of midportion 21 of lever bar 12. The hook 32 on extension 28 is adapted to engage a portion of the peripheral edge of the hub cap or wheel cover to be removed. Rise portion 26 of angle bar 14 enables the extension 28 to be disposed essentially perpendicular to the hub cap or wheel cover to be removed (see FIGURE 1), thereby facilitating easy removal of the same as will be described hereinafter. Where the inventive device is primarily to be used in connection with removal of decorative wheel covers of automobiles, it has been found advantageous that the rise portion be at least six inches in height.

In operation, and as may be more fully understood by reference to FIGURE 1, the end portion 22 of lever bar 12 is positioned to abut the wheel base 34 below the hub cap 36 to be removed. Handle 20 is then raised or lowered to enable hook 32 to engage the top portion of the peripheral edge of the hub cap. A slight downward pressure then applied on handle 20 will readily cause removal of the hub cap. The fact that only a "slight" downward force is required to remove the hub cap may be attributed to rise portion 26 of angle bar 14. This "rise" positions the hook-end extension 28 in a position substantially perpendicular or normal to the surface of the hub cap, thereby transferring hte downward force on the handle 20 into a pulling force perpendicular or normal to the surface of the hub cap.

The device of this invention has been found to be particularly successful in removing decorative wheel covers of the type which have a plurality of resilient fingers extending from their peripheral edge and in locking engagement with the tire rim. The prior art devices tend to permanently bend or deform these resilient fingers rendering it difficult to replace the wheel cover; however, since the device of this invention exerts a pulling force on the wheel cover which is essentially perpendicular thereto, it pulls the wheel cover off of the wheel base with relative ease, and without permanent deformation of the resilient fingers.

Figure 3:
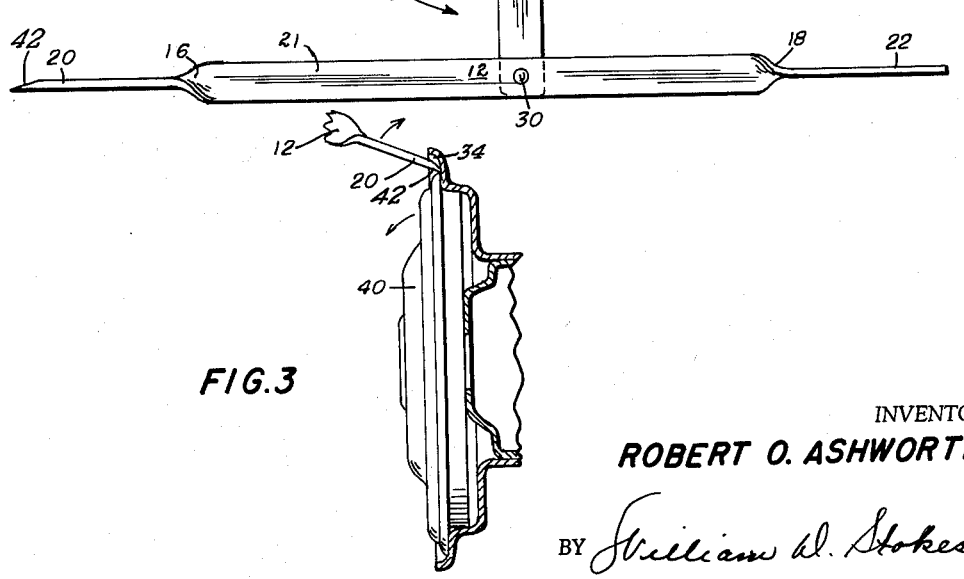
FIGURE 3 shows the device of this invention, partially broken away, being employed to remove a very large wheel cover from a wheel base.

FIGURE 3 shows the tapered end of handle portion 20 being employed to remove a wheel cover 40 which has no peripheral lip portion which may be readily engaged by a hook member. The tapered end is wedged between the wheel base 34 and the wheel cover 40, and a slight upward force is exerted on the opposite end straight bar 12 to effect removal of the wheel cover.

As can be readily appreciated from the foregoing, a simple, practical, self-contained, and relatively inexpensive wheel tool has been provided which is capable of performing simply and with the minimum expenditure of mental and physical strain, various, heretofore difficult and/or tedious tasks, on a wheel assembly.

While the invention has been described in relation to the removal of wheel covers and/or hub caps from wheel bases, it will be observed that this novel device may be effectively employed and adapted to remove grease fittings, manhole covers, or the like.

It should be understood that the above described embodiment is illustrative only, and that many modifications thereof may be made without departing from the spirit and scope of the invention.

What is claimed is:

An improved device for removing a hub cap or decorative wheel cover from a wheel base, comprising:

a substantially straight lever bar;

said lever bar being twisted approximately 90° at two points along the length to provide a flat handle portion, a mid-portion, and a flat end portion;

said handle portion being tapered at its terminal end to provide a thin edge thereon; and and angle bar having one end pivotally connected to the central portion of said lever bar, and having a hook on its other end adapted to engage a portion of the peripheral edge of a hub cap, wheel cover, or the like;

said angle bar being twisted 90° and bent at about a 90° angle at a point intermediate its ends to provide a rise portion, between said 90° bend and the said one end of said angle bar that is pivotally connected to said lever bar, and an extended portion, having said hook on the free end thereof.

References Cited by the Examiner
UNITED STATES PATENTS 1,815,220  7/31  Strong _____ 254—131

FOREIGN PATENTS 777,805  12/34  France.

WILLIAM FELDMAN, *Primary Examiner.*